Figure 1:
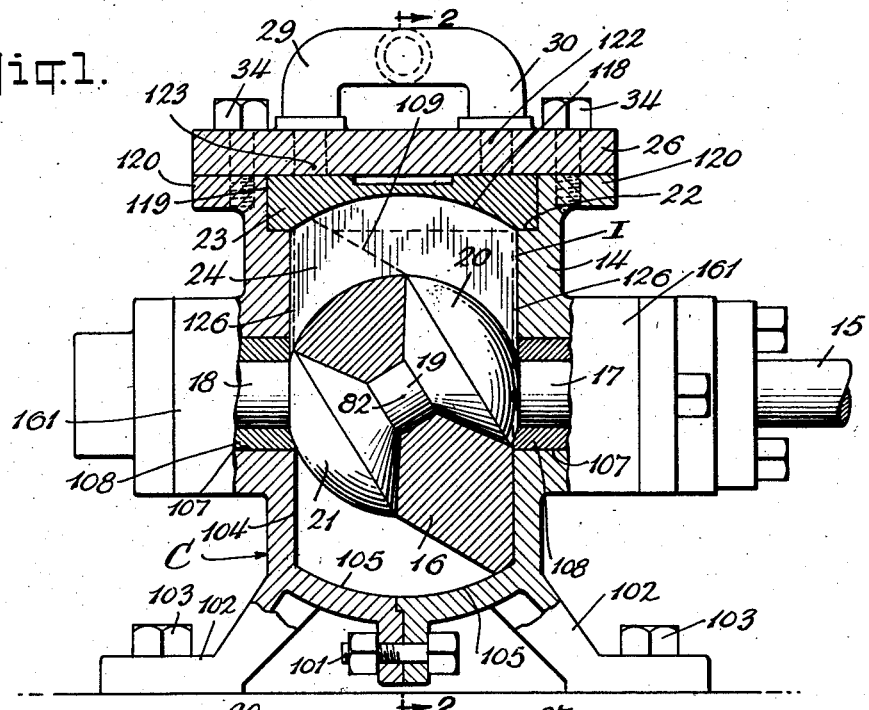

INVENTOR.
ALOIS WICHA
BY Oscar A. Geier
ATTORNEY

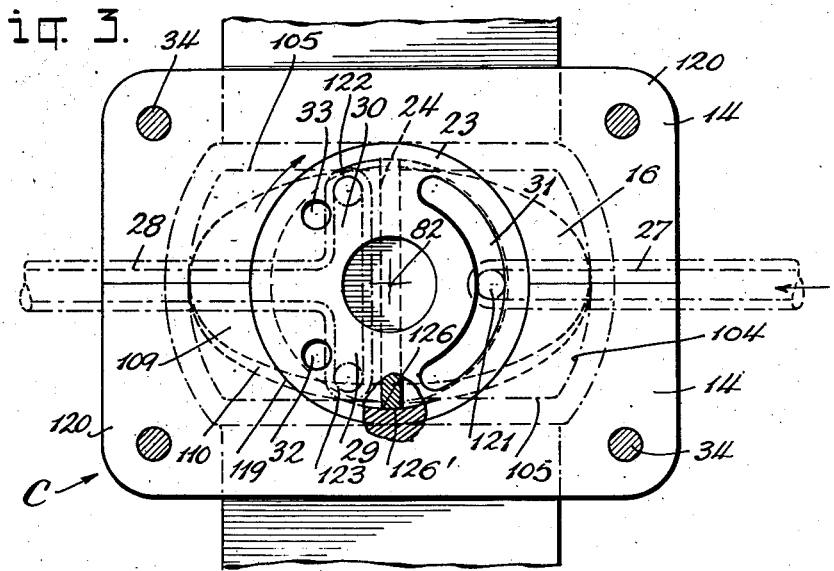

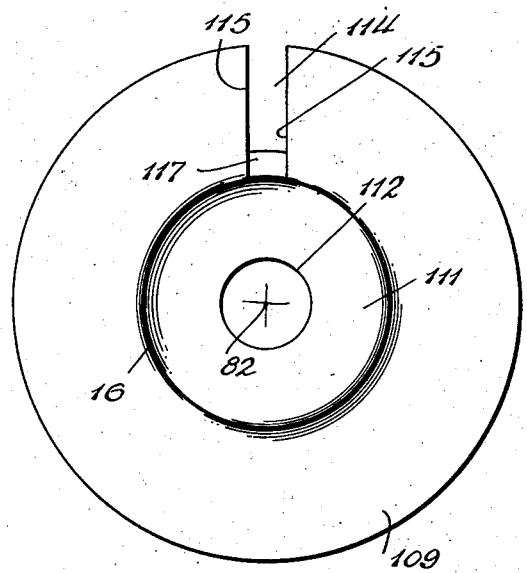
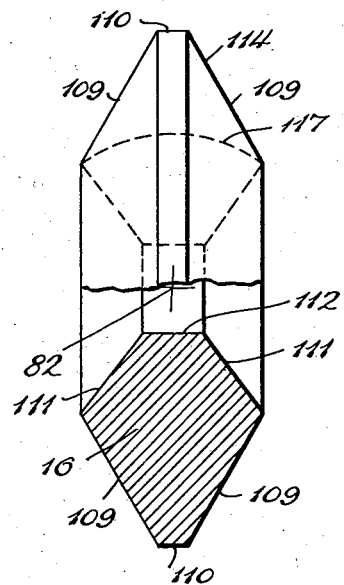
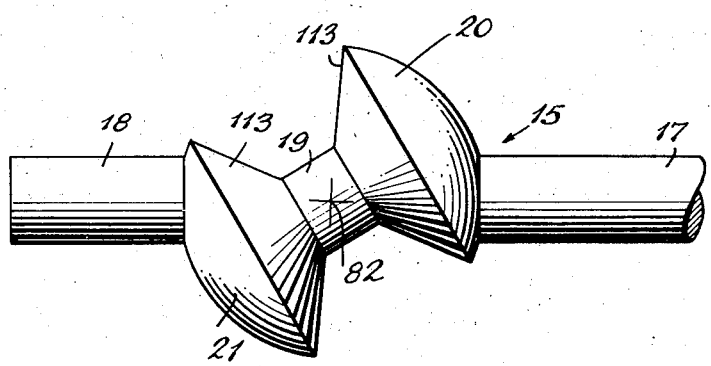

Jan. 1, 1935.  A. WICHA  1,986,454
GAS AND VAPOR COMPRESSOR
Filed Feb. 13, 1933  7 Sheets-Sheet 4
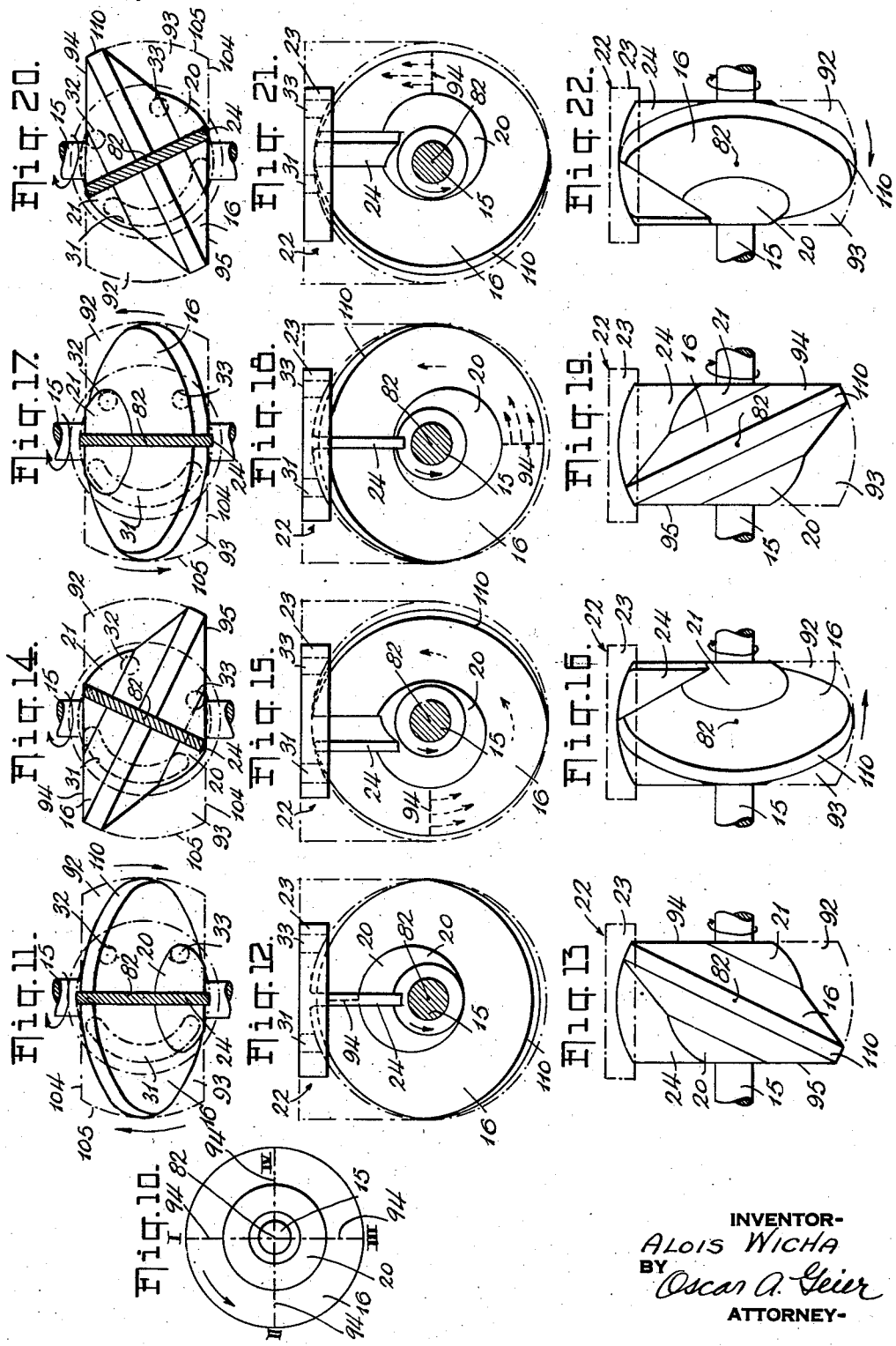
INVENTOR-
ALOIS WICHA
BY
Oscar A. Geier
ATTORNEY- Jan. 1, 1935.  A. WICHA  1,986,454
GAS AND VAPOR-COMPRESSOR
Filed Feb. 13, 1933  7 Sheets-Sheet 5

INVENTOR
ALOIS WICHA
BY
Oscar A. Geier
ATTORNEY

Jan. 1, 1935.  A. WICHA  1,986,454
GAS AND VAPOR COMPRESSOR
Filed Feb. 13, 1933  7 Sheets-Sheet 6
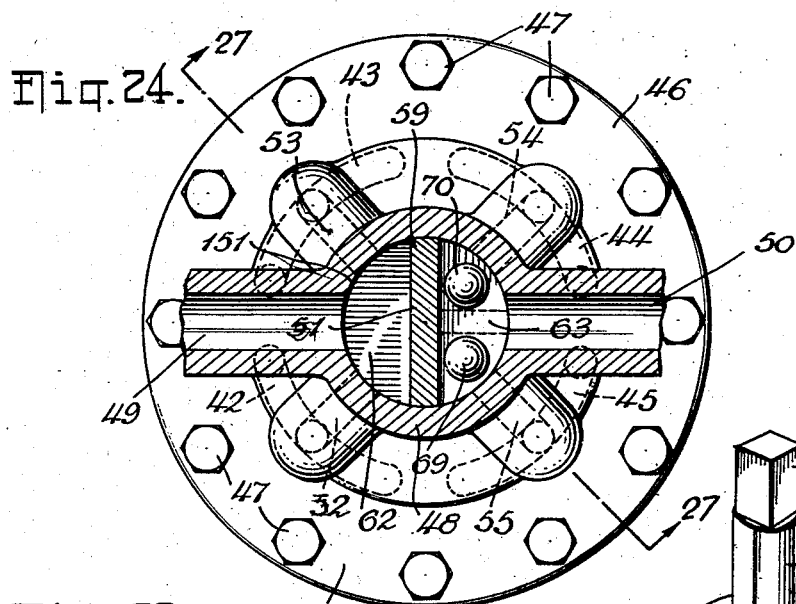//
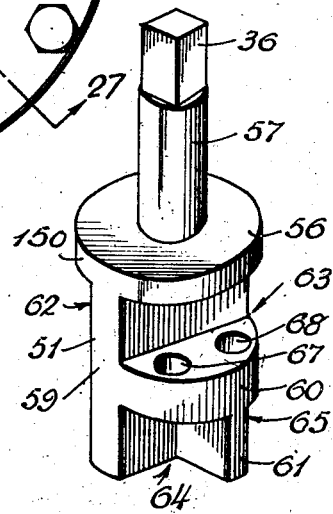
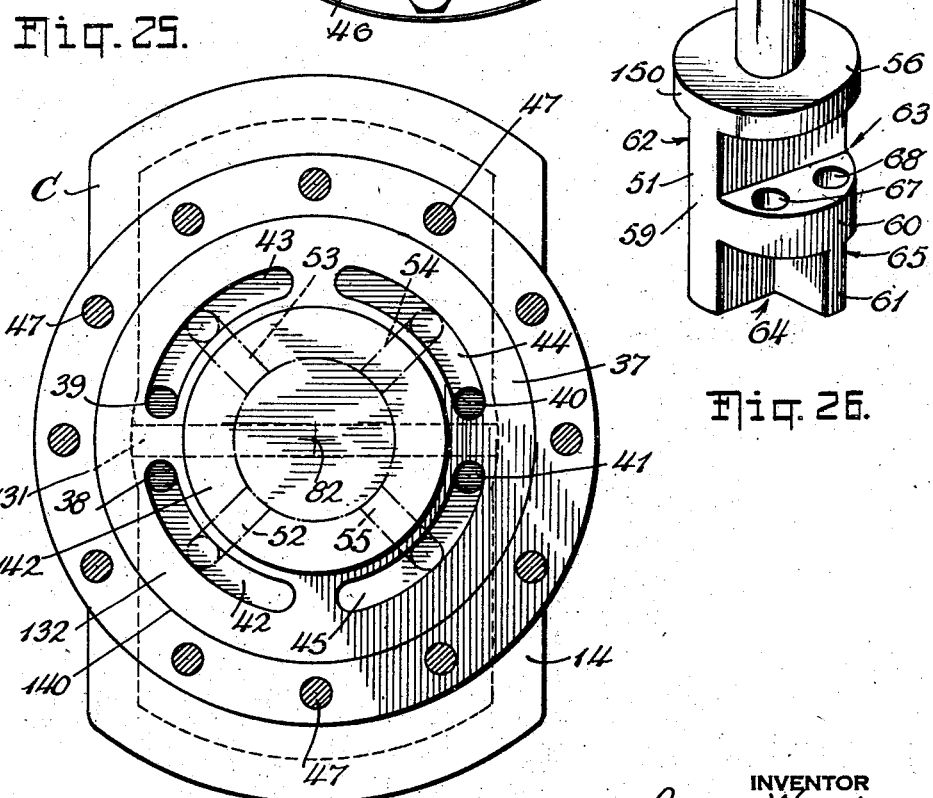
INVENTOR
ALOIS WICHA
BY Oscar A. Geier
ATTORNEY Jan. 1, 1935.  A. WICHA  1,986,454
GAS AND VAPOR COMPRESSOR
Filed Feb. 13, 1933  7 Sheets-Sheet 7
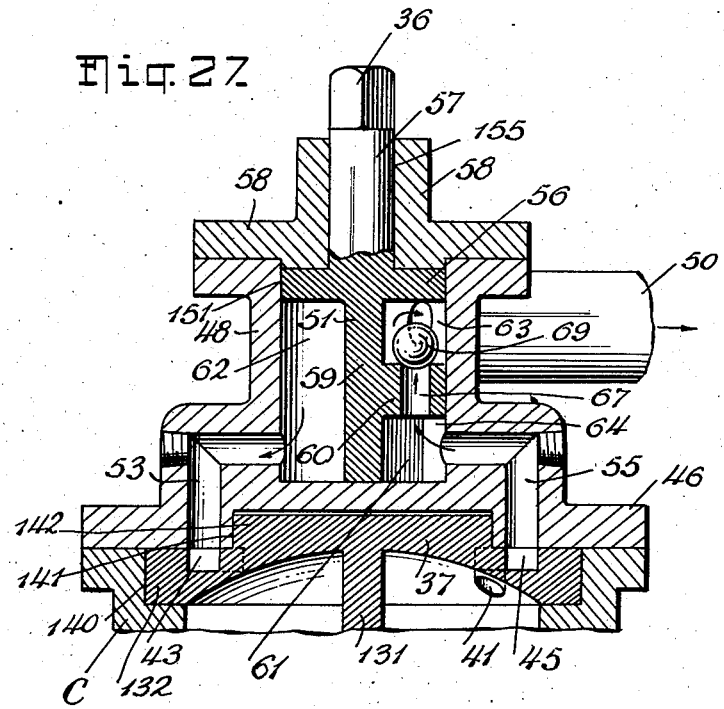
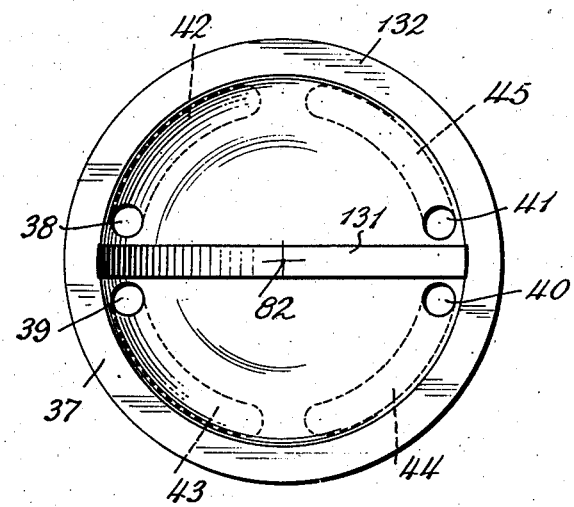
INVENTOR
ALOIS WICHA
BY Oscar A. Geier
ATTORNEY Patented Jan. 1, 1935

1,986,454

UNITED STATES PATENT OFFICE 1,986,454

GAS AND VAPOR COMPRESSOR

Alois Wicha, Dresden, Germany, assignor to Erospha, Inc., Brooklyn, N. Y., a corporation of New York Application February 13, 1933, Serial No. 656,638

21 Claims. (Cl. 230—148)

This invention relates to fluid actuating devices and particularly relates to compressors for gases or vapors.

Although the present invention in many of its aspects is applicable to spherical engines, it will be particularly described in connection with spherical gas or vapor compressors.

Among the objects of the present invention are to provide a durable compressor or similar fluid actuating mechanism which may be operated directly from a rotating shaft; which will be compact, light in weight and relatively inexpensive; which will have few parts; and which will not require troublesome lubricating installation or be readily subject to derangement.

Other objects will be sufficiently obvious and will appear during the course of the following specification.

In accomplishing the objects above stated, the applicant has devised an altogether novel type of compressor, consisting of a casing, the interior of which may take the form of a spherical section or segment, with a peripheral spherical surface and flat or conical side walls; an oscillating compressor, disc, the oscillating movement of which takes place both horizontally and vertically within said casing about a fixed center; a drive shaft which has an eccentric driving bearing for the impeller disc causing this impeller to undergo said movement within the casing resulting in sucking-in the gas or vapor through the inlet and expulsion of such gas or vapor, through the outlet; and a guide member pivotally mounted in said casing, capable of oscillating on a vertical axis, and provided with a projecting element fitted into a slot in the impeller disc to prevent the compressor disc from rotating while permitting it to partake of said oscillating movement. This guide member may be designed not only to prevent rotation of the compressor disc, but also to control the compression of the gas or vapor, so that such gas or vapor will not be released or permitted to pass into the outlet until it has been compressed to a predetermined extent.

The impeller disc, the sides of which may be flat or outwardly converging or diverging, closely conforms to the spherical interior surface of the interior chamber along its entire periphery and is obliquely positioned within the chamber, and diametrically oppositely converges toward said walls thereof. As a result the interior chamber will be divided into two compartments which will be separated from each other by the impeller. The oscillating movement of the disc will continuously rotate these compartments within the casing.

The guide member is positioned between the inlet and outlet ports of the pump and constructed or associated with other elements, so as to prevent direct communication therebetween. As the compartments pass across the guide member, they will be divided thereby. During this passage they will decrease in volume on the approach or outlet side of the guide member, compressing and/or expelling fluid through the outlet port; and at the same time they will increase in volume on the inlet side of the guide member, sucking fluid in through the inlet port.

The time of opening of the compression compartment to the outlet port is controlled by the pivoted guide member and it may be regulated so that such opening will not take place until a predetermined compression has been achieved.

In compressors considerable difficulty has been encountered in achieving readily reversible operation, and it is therefore a particular object of the present invention to so design the compressor structure above described that it will be possible to reverse the same by a relatively simple manipulation.

This last-mentioned object has been preferably accomplished by so constructing the guide member as to enable it to be readily reversed or to provide auxiliary means which will readily reverse the connections thereto.

The invention will appear more clearly from the following detailed description when taken in connection with the accompanying drawings showing preferred embodiments of the inventive idea.

Figure 2:
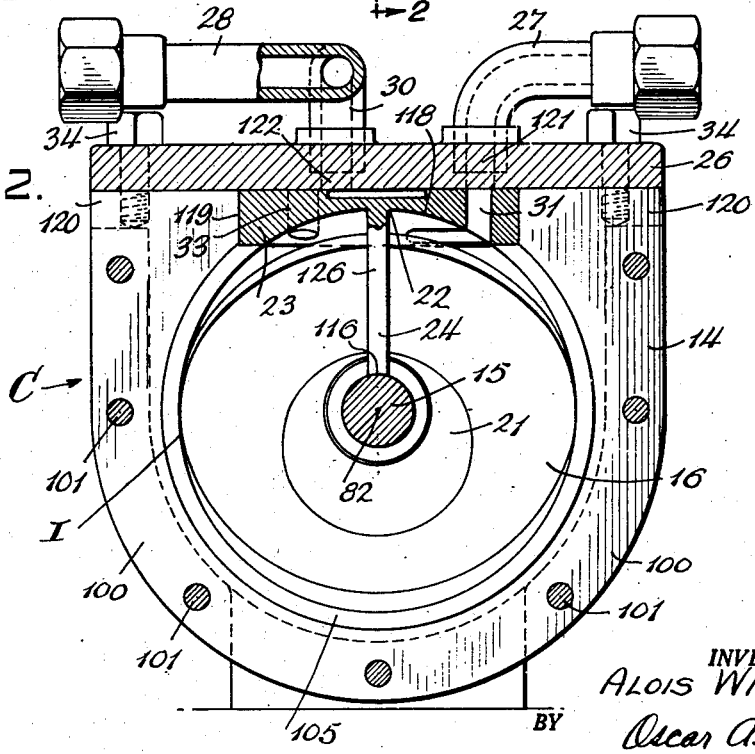

In the drawings:

Figs. 1 to 22 illustrate one embodiment, Fig. 1 being a vertical, central, axial sectional view through the compressor; Fig. 2 being a side sectional view upon the line 2—2 of Fig. 1; Fig. 3 being a top view with the cover removed; Figs. 4 and 5 being diagrammatic views to show the several positions of the guide with respect to the inlet and outlet ports; Fig. 6 being a side elevation of the guide; Fig. 7 being a bottom view of the guide; Figs. 8a and 8b being respectively front and side views of the impeller, Fig. 8b being in fragmentary section; Fig. 9 being a side elevation of the shaft; and Figs. 10 and 22 diagrammatically illustrating the operations of the impeller disc or compressor member; and Figs. 23 to 28 illustrate another embodiment, Fig. 23 being a vertical, central, axial sectional view; Figs. 24 and 25 being transverse sectional views upon the lines 24—24 and 25—25 of Fig. 23; Fig. 26 being a perspective view of a reversible valve of the compressor; Fig. 27 being a side sectional view, along line 27—27 of Fig. 24; and Fig. 28 being a bottom plan view of the guide member.

The compressor shown in Figs. 1 to 9 includes a casing C, an impeller or compressor disc 16, a shaft 15 and a guide member 22, said latter member serving to regulate the degree of compression.

The compressor shown in Figs. 1 and 9 of the drawings comprises a compressor casing C having two half sections 14 which are bolted together at the flanges 100 by the bolts 101 (see Figs. 1 and 2). Each half of the casing is provided with a foot 102 which may be bolted to a support as indicated in 103.

The compressor shown in Figs. 1 to 9 of the drawings comprises a casing C having an interior chamber I taking the form of a spherical sectional segment with a peripheral spherical surface 105 and flat side walls or fluid reaction members 104. The sides of the casing C are provided with cylindrical bosses 161 containing cylindrical openings 107 to receive the bearing sleeves 108 for said shaft 15.

The shaft 15 (see Figs. 1 and 9) is provided with two cylindrical bearing portions 17 and 18, which bear within the sleeves 108, and a middle eccentric portion 19, which is obliquely arranged with respect to the end portions and connected to them by the spherical conical members 20 and 21.

These spherical conical members 20 and 21 diverge inwardly towards the center point 82 of the casing. The spherical conical members 20 and 21 are symmetrically disposed about the center point 82 of the casing, which is also the center point of the eccentric 19.

The rolling oscillating impeller or compressor disc 16 (see Figs. 1, 2, 8a, and 8b) is provided with two outwardly converging truncated conical surfaces 109 which are joined at the outer periphery of the disc by a spherical surface 110, which is in close adjuxtaposition in respect to the spherical interior surface 105 of the chamber I. The sides of the impeller disc 16 are provided with symmetrically disposed frusto-conical depressions 111 which are joined by a central cylindrical opening 112. The central cylindrical opening 112 bears upon the eccentric 19, while the conical surfaces 111 of the disc bear upon the sides 113 of the spherical cones 20 and 21 of the shaft 15 (see Fig. 9).

The impeller disc 16 will be subjected to an oscillation upon rotation of the shaft 15 by the eccentric 19, but will be prevented from turning by the guide member 22, which has a fin 24 (see Figs. 1, 2, 6 and 7). The fin 24 fits slidingly into the slot 114 in the top of the impeller disc 16. The fin 24 slides against the walls 115 of the slot 114 and the bottom of the fin is provided with a spherical surface 116 which rides over the spherical surface 117 at the bottom of the slot 114 and over the spherical outside surfaces of the conical members 20 and 21 of the shaft 15.

The guide member 22 is provided with a circular base plate 23 (see Figs. 1 to 7), which has an indentation or depression of spherical contour 118. The circular base plate 23 is held in a sliding fit and bears within the cavity 119 formed in the top of the casing C, when the cover 26 is connected by the bolts 34 to the flanges 120 on the top of casing C.

The end edges of the fin 24 are provided with cylindrical surfaces 126 (see Figs. 1, 3 and 7), which preferably oscillate in the correspondingly shaped depressions 126' in the side walls 104 of the interior chamber I. These depressions 126' are of such size and depth that the contact of the edges 126 with the depressions 126' will be maintained throughout the movement of the impeller disc 16. The cover 26 (see Figs. 1 to 5) carries an intake pipe 27 and an outlet pipe 28. The outlet pipe is provided with two branches 29 and 30 which lead to the spaced ports 123 and 122 in the cover 26. The intake 27 leads to a single port 121 (see Fig. 2). The fin 24 will prevent direct communication across the top of the interior chamber I between the inlet and outlet connections 27 and 28 which are positioned on opposite sides of the guide member.

The base plate 23 of the guide 22 is provided with ports 31, 32 and 33 which, respectively, cooperate with the ports 121, 123 and 122 previously mentioned (see Figs. 3 to 7).

The port 31 in the circular plate 23 takes the form of an arcuate slot and is in communication with the inlet 121 throughout the oscillation of the guide 22. The outlet ports 32 and 33 in the plate 23 take the form of cylindrical openings.

The ports 31, 32 and 33 are positioned at the same radial distances as the ports 121, 122 and 123. The angular separation between the ports 32 and 33 is much less than the angular separation between the ports 122 and 123. As a result communication is only established between the outlet ports 122 and 33 and between the outlet ports 123 and 32 at the extreme positions of the oscillating guide as indicated in Figs. 4 and 5, only one pair of ports, namely 122 and 33 or 123 and 32 being in communication at any one time. The ports 32, 33, 123 and 122 all preferably have the same cross-sectional area, as do also the bores of the pipes 28, 29 and 30.

In operation, the gas or vapor to be compressed will be sucked into a compressor compartment through the inlet pipe 27, the cover port 121 and the arcuate guide port 31. Then the volume of gas or vapor in this compartment will be carried over to the outlet guide ports 32 or 33 and will be compressed. When the compression has reached a predetermined extent, further movement of the impeller disc 16 will move the base plate 23 sufficiently to cause communication between the ports 123 and 32 or the ports 122 and 33. The compressed gas will then flow through the outlet pipes 29 or 30 and 28.

The operation is most conveniently shown in the diagrammatic views, Figs. 10 to 22. Fig. 10 illustrates the turning of the compressor disc 16 and Figs. 11 to 22 show top, front and side views of the compressor disc 16 in each one of the positions designated in Fig. 10, namely I, II, III and IV.

Figure 23:
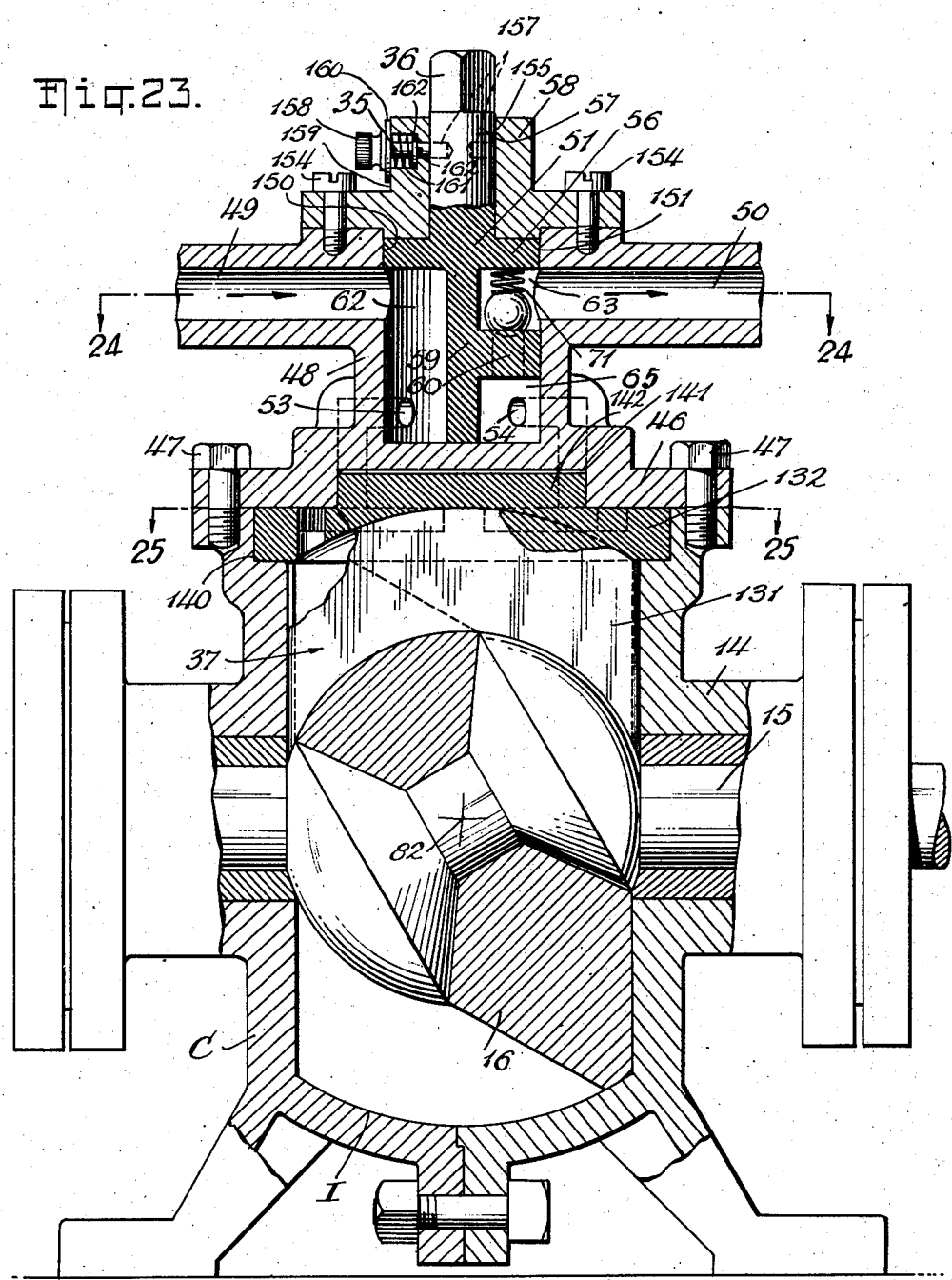

Figs. 11, 12 and 13 are, respectively, top, front and side views of the impeller disc in position I of Fig. 10; Figs. 14, 15 and 16 are corresponding views in position II; Figs. 17, 18 and 19 are corresponding views in position III; and Figs. 21, 22 and 23 are corresponding views in position IV.

As is apparent from Figs. 1 to 9, as the shaft 15 rotates, the impeller disc 16 will be caused to sweep backwardly and forwardly both horizontally and vertically in the interior chamber I with the result that the impeller disc 16 will partake of an oscillation. At the same time the axes about which the impeller tends to swing will also tend to rotate about the fixed common center point 82 of the casing C, of impeller disc 16 and of the shaft 15. The horizontal axis of the impeller disc 16 will tend to swing in a horizontal plane and the vertical axis will tend to swing in a vertical plane. This last-mentioned vertical plane will also tend to rotate or oscillate about the central vertical axis of the casing as indicated by the movement of the guide fin 24 in Figs. 11, 14, 17 and 20.

As a result of this movement, all points on the periphery of the impeller disc 16 removed from the horizontal axis will tend to move along lemniscate curves which become of greater latitude as the point becomes elevated and removed from the center point 82 so that points at the top and bottom of the disc 16 will move in lemniscate curves of maximum amplitude. These curves will lay a spherical surface described upon a radius equal to the distance of the point from the center point 82. Because of this movement, no substantial acceleration or deceleration forces will be exerted upon the mass of the impeller disc 16 with the result that the abrupt changes in acceleration characteristic of the reciprocating piston pump are altogether eliminated.

As indicated in Figs. 11, 12 and 13, respectively, in top, front and side views, the impeller disc 31 will divide the interior I of the casing C into two compartments 92 and 93 which are diametrically oppositely, disposed in respect to the center point 82 of the pump. In Figs. 11, 12 and 13 the compartment 93 occupies the upper part of the casing, while the compartment 92 occupies the lower part of the casing. In Figs. 14 and 16 the compartment 92 occupies the right side of the casing, while the compartment 93 occupies the left side of the casing. In Figs. 17, 18 and 19 the compartment 92 occupies the top portion of the casing, while the compartment 93 occupies the bottom portion of the casing C, and in Figs. 20 and 22 the compartment 92 occupies the left side of the casing, while the compartment 93 occupies the right side of the casing.

These compartments 92 and 93, due to the oscillation movement of the impeller disc 31, are caused to rotate continuously within the interior chamber I of the casing C. During this rotation, these compartments are successively opened and closed to the inlet port 31, then the gas or vapor is compressed therein, and then they are opened to the outlet ports 32 and 33 so that compressed fluid may be removed. The outlet port 32 receives the effluent from the compartment 92, while the outlet port 33 receives the effluent from the compartment 93.

These compartments 92 and 93 will transfer the gas or vapor through the lower half of the casing from the inlet 31 to the outlets 32 and 33 and will be prevented from transferring fluid or liquid reversely from the outlet to the inlet in the upper half of the chamber I by the guide 22 and its fin 24. It will be noted in Figs. 11, 14, 17 and 20 that the chambers 92 and 93 must move through the guide 22 and across the fin 24, with the guide preventing any communication from one side of the chamber to the other as it is moving through said guide.

As shown in Fig. 11 the compartment 93 is moving to the left and is bisected by the fin 24, while in Fig. 14 both compartments are divided by the fin 24. In Fig. 17 only the chamber 92 is divided by the guide, and as the compartment moves to the left, its volume increases on the left of the fin 24, and decreases on the right thereof.

As the compartments 92 and 93 commence to move through the fin 24 after being cut off from the inlet 31, the volume of the compartments on the outlet side of the fin decreases, with the result that the gas or vapor is then compressed. When the compression has reached a predetermined extent, the port 32 for compartment 92 and port 33 for compartment 93 will move sufficiently to communicate with the outlet ports 123 and 122 in the casing. The compressed gas or vapor will then be released into the outlet pipe 28 through the branch pipes 29 or 30.

As the gas is being compressed, the volume of the compartment on the inlet side of the fin 24 increases with the result that the fluid is being sucked in through the inlet slot 31 to fill the increasing volume on that side. Upon continued movement, the compartment will be filled through the inlet, and then will cut off therefrom. The cycle will then be repeated.

The inlet and outlet subdivisions of the compartments 92 and 93 in addition to being separated by the fin 24 are also separated by the convergence between the side of the impeller disc 16 and the side walls 104 of the chamber I. This convergence is indicated for the compartment 92 in Figs. 12, 15, 18 and 21 by the dotted line 94. This contact 94 rotates within the interior I. This convergence is also indicated at 94 in Figs. 13, 14, 19 and 20. The corresponding convergence for the compartment 93 is indicated at 95 in Figs. 13, 15, 19 and 20. It will be noticed that these areas or lines 94 and 95 are always diametrically oppositely disposed on opposite sides of the center point 82.

In Figs. 11, 12 and 13 the compartment 92 has been filled through the inlet slot 31 and is about to be cut off from said inlet by the edge 110 of the impeller disc 16. The same position for the compartment 93 is shown in Figs. 17 to 19 (position III).

After the compartment 92 has been cut off from the inlet, in position I of Figs. 11 to 13, this compartment will pass through the fin 24, decreasing in volume on the outlet side of said fin in positions II and III. When the guide outlet port 32 has swung into the position of Fig. 20, it will permit the compressed gas in the relatively small subdivision of the compartment 92 on the outlet side of the fin 24 to flow through the outlet pipes.

In the case of compartment 93, this compartment will decrease in volume on the outlet side of the fin 24 through position III of Figs. 17 to 19, position IV of Figs. 20 to 22, and position I of Figs. 11 to 13. In position II of Figs. 14 to 16, the compressed gas in the compartment 93 on the outlet side of the fin 24 will be released through the guide port 33.

In each position, as the compartments 92 and 93 are decreasing in volume on the outlet side of the fin 24, they are passing through said fin and increasing in volume on the inlet side and are sucking in the gas or vapor to be compressed through the slot 31. This suction through the inlet slot 31 will continue until the lines or areas 94 and 95 pass across the inlet port 31 and until the edge 110 of the impeller disc swings over the entire inlet slot and moves against the side of the casing. For example, in Fig. 11 the movement of the impeller disc is about to cut off the compartment 92 from the inlet port 31, while in Fig. 17 such movement has just cut off the inlet port 31 from the compartment 93. In Figs. 14 to 20 the inlet port 31 is connected to both compartments 92 and 93.

It is, therefore, evident that as the shaft 15 rotates and the impeller disc 16 and the guide 22 oscillate, gas or vapor will be continuously acted upon and moved from the inlet 31 to the outlet ports 32 and 33 by the compartments 92 and 93 and released after compression in such compartments. It will be noted that the compressor is volumetric in its action except for a small amount of leakage across the periphery 110 and across the lines or areas 94 and 95, a volume of uncompressed gas equal to the volumes of the compartments 92 and 93 being transferred from the inlet to the outlet and compressed during such transfer for each complete revolution of the shaft.

The degree of compression of the gas in the casing C before release through the outlet ports 32 and 121 or the outlet ports 33 and 122 will depend upon the decrease in volume of the compartment containing the gas or vapor before said pairs of ports are, respectively, placed in communication. The sooner communication between the ports 32 and 33 is established, respectively, with ports 121 and 122, the smaller the compression, and the later such communication is established, the higher the compression. By controlling the angular distance between ports 32 and 33, it is therefore possible to regulate the compression of the gas. If desired, different guide members 22 having different angular distances between ports 32 and 33 may be employed. Thus guide members having a smaller angular separation of guide ports 32 and 33 will give a higher compression, while those with a greater angular distance will give lower compression.

The relative position of the intake and outlet connections may be readily reversed, as is desirable when the direction of rotation of the shaft 15 is reversed. By removing the screws 34, shown in Figs. 1 and 2, and raising the casing cover 26, the guide member 22 may be lifted out of position, rotated 180°, and then reinserted into the slot of the piston. The cover 26 is also placed in a reversed position on top of the casing 14 and is again attached to the casing by the screws 34. The shaft 15 of the compressor may then rotate in the opposite direction.

The reversal of the direction of rotation in the embodiment of Figs. 1 to 7 may only be accomplished after the compressor has been stopped and partly dismantled. In an embodiment of Figs. 23 to 28, the direction of flow may be conveniently reversed without stopping the machine by a relatively simple mechanical manipulation.

In Figs. 23 to 28 the casing C, the shaft 15 and the impeller disc 16 are constructed and operate as previously described. The guide member 37 is provided with a base plate and a guide fin very similar in construction and operation to guide member 22 of Figs. 1 to 7.

The guide member 37, however, differs from the guide 22 of Figs. 1 to 7 in being provided with four spaced cylindrical ports 38 and 39, 40 and 41, which are symmetrically positioned on opposite sides of the guide fin 131. The upper rear side of the guide base plate 132 is provided with the arcuate slots 42, 43, 44 and 45. The arcuate slots 42, 43, 44 and 45 have sufficient depth to extend partway through the guide, and the ends of these slots adjacent the fin 131 terminate in and coincide with the ports 38, 39, 40 and 41, respectively.

The base plate 132 of the guide 37 is retained and bears within the cavity 140 formed between the casing C and the cover 46, which cover is connected to said casing by bolts 47 (see particularly Figs. 23 and 24). The cover is provided with a cylindrical cavity 141 which receives the correspondingly shaped boss 142 on the upper side of the guide member 37.

The cover 46 carries a cylindrical valve casing 48 (see Figs. 23 and 27) which carries inlet and outlet connections 49 and 50. Either connection may serve as a gas intake, depending upon the position of the valve 51. The valve casing 48 and cover 46 as shown constitute a single unit and are provided with four symmetrically located L-shaped bores or conduits 52, 53, 54 and 55 which, respectively, communicate with the slots 42, 43, 44 and 45 and the openings 38, 39, 40 and 41 in the base plate 132 of the guide 37.

The valve 51 is shown in perspective in Fig. 26 and in a side sectional view in Figs. 23 and 27 and in transverse sectional view in Fig. 24. The valve structure includes a horizontal abutment or bearing plate member 56, the outer edge surfaces 150 of which are cylindrical and bear against the inner surface 151 of the valve casing 48 as shown in Fig. 24. The plate member 56 also abuts against the cover element 58 which is bolted at 154 to the top of the valve casing 48.

The reversing valve 51 is also provided with a vertical partition wall member 59, a semi-circular horizontal plate member 60 and another small partition wall 61. The partition wall 61, said semi-circular plate 60 and said vertical partition wall 59 are transverse to each other (see Figs. 23, 24, 26 and 27). The walls 59 and 61 and the plate 60 divide the cylindrical chamber within the valve casing 48 into an inlet chamber 62 and outlet chambers 63, 64 and 65. The plate 60 is provided with the vertical ports 67 and 68 which, respectively, establish connection between the chambers 64 and 65 and the chamber 63. The ports 67 and 68 are preferably closed by check valves 69 and 70, ball check valves being shown, which in one embodiment (Fig. 23) are pressed against the outer ends of the ports 69 and 70 on top of the plate 60 by the springs 71.

As shown in Figs. 23, 24 and 27, the gas to be compressed will pass through the intake pipe 49 to the valve chamber 62 and either through the channel 52, the slot 42 and the opening 38, or through the channel 53, the slot 43 and the opening 39 to one of the compression compartments 92 or 93 inside of the compressor casing C. This compartment will be increasing in volume as the gas is sucked thereinto through the pipe 49 as previously described. The compressed gas or vapor on the other side of the impeller 16 will flow outwardly either through the outlet port 40, the slot 44, the channel 54, the compartment 65, the bore 68 and the chamber 63 to the outlet connection 50, or through the port 41, the slot 45, the channel 55, the chamber 64, the port 67 and the chamber 63 to the outlet pipe 50, depending upon which compartment formed within the compressor casing is being decreased in volume by the oscillation of the impeller 16.

On the compression side, the gas will be compressed within the outlet compartment (not shown) connected to the outlet pipe 50 until it reaches the maximum compression obtainable by the pumping compartments 92 and 93. The valves 69 and 70 merely serve as check valves to prevent return flow into said compartments 92 and 93.

The cover element 58 attached to the top of the valve casing 48 is provided with a central cylindrical opening 155 (see Figs. 23, 26 and 27) receiving the shaft 57 of the valve 51, the upper end of which is provided with a tool receiving portion 36 enabling the rotation thereof. The pivot stud or shaft 57 is provided with the lateral diametrically opposed cavities 157 which receive the inner end of the locking pin 35. The outer end of the pin 35 is provided with a gripping portion 158, which abuts against the side 159 of the cover 58 at 160 (see Fig. 23). The coil spring member 161 reacts against a plate 162 fixed to the pin 35 and retains said pin in one of the cavities 157 holding the pivot stud 57 against rotation.

To turn the pivot stud 57, the pin 35 is drawn outwardly against the spring 161 by gripping the portion 158. Then a wrench is applied to the squared top 36 of the stud 57. The pivot stud 57 of the valve 51 may be turned 180° until the opposite cavity 157 coincides with the pin 35. Thereupon the pin 35 may be released into the cavity and the valve will be held in its reversed position.
In considering the operation of the fluid actuating device of the present invention, which operation has been diagrammatically illustrated and described in connection with Figs. 10 to 22, it is to be noted that the impeller 16 in the course of its oscillating movement causes a displacement of fluid both when it moves toward the wall of the casing C and when it moves away from the wall of the casing C.

Since the entire side wall or side surface of the impeller does not move toward the side wall of the interior chamber simultaneously but rather is caused to move relatively to said surface so that one portion of the side of the impeller is advancing toward the side of the casing, while another portion of the side of the impeller may be moving away from the same side wall of the casing, it is evident that the oscillating movement of the impeller will result in moving fluid circularly around within the interior of the casing.

It is thus evident that the displacement action of the oscillating impeller of the present invention differs substantially from the displacement action of the piston of a reciprocating pump in that whereas the motion of the reciprocating piston causes linear movement of fluid to the end of a cylinder, in the device of the present application, on the other hand, the displacement action of the impeller causes a rotational movement of the fluid from the inlet to the outlet along the face of the impeller. The guide with its adjuncts extending between the side walls of the chamber I causes the oscillation action to draw in fluid from the inlet and to force fluid out through the outlet.

The volume for containing fluid or liquid within the casing of the device will always be substantially constant since it will be equivalent to the volume of the interior chamber minus the volume of the impeller and the volume of the guide with its adjuncts. As previously described, the impeller will divide the chamber into two pumping compartments which, although they are of substantially constant volume throughout operation of the device (except for the volume of the guide or its adjuncts which may project into them) they nevertheless will have portions of varying volumetric capacity in communication with the inlet and outlet, the volume in communication with the inlet increasing while the volume in communication with the outlet is decreasing.

From this point of view it may be considered that the guide is a fixed fluid impelling device which moves relatively through the compart- ments on opposite sides of the impeller to increase their volume on one side, causing drawing in of liquid from the inlet and to decrease their volume on the other side, causing discharge of liquid through the outlet. This action, however, is quite different from the action of a reciprocating piston pump in which there is a fixed piston and a movable cylinder, in that in the present invention the displacement member or the guide member moves continuously through the compartments, one after the other without the abrupt reversals as occur in all reciprocating pumps.

It is apparent from the foregoing description of the operation, that the shaft may be rotated in either direction, and that as a result of such reverse rotation the inlets and outlets will be similarly reversed. The discharge output of the device is proportional to the speed of rotation of the shaft, while the head or height of delivery is independent of the speed of rotation.

The present application is a continuation in part of my copending application Serial No. 636,295, filed Oct. 5, 1932, and it is particularly directed to the utilization of a spherical engine as a gas or vapor compressor. The subject matter shown and described in the present application but not claimed therein is claimed in my copending applications Serial Nos. 656,637; 656,639; 656,640 and 656,641 filed respectively Feb. 13, 1933; 673,244 and 673,245 filed May 27, 1933, and 696,944, filed November 7, 1933, and it is obvious that the impeller, the casing, the guide member and/or the separating wall between the inlet and the outlet ports may be modified as shown in these copending applications.

Other types of guiding members and/or separating walls and of impelling pistons are shown in copending applications Serial Nos. 656,637; 656,639 and 656,641.

Copending application Serial No. 656,637 is particularly directed to a converging guide whether it takes the form of an oscillating wall or a cone. Serial No. 656,639 is particularly directed to the provision of central conical bearings. Serial No. 656,641 is directed to the construction and utilization of the diverging impeller. Serial Nos. 673,244 and 673,245 are directed to the provision of fixed separating walls with guide members positioned in other parts of the casing to control the movement of the oscillating impeller. Serial No. 696,944 is directed to the provision of a space or surface packing or seal between the periphery of the impelling piston and the periphery of the interior spherical chamber and between the side walls in the interior chamber and the side surfaces of the impelling piston, the particular embodiment employed in this case showing rotating side walls which move with a central shaft.

What is claimed is:

1. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, said impeller being provided with a transverse slot and said means including in part a separating plate extending transversely across said interior chamber and said slot, said plate being provided with a base disc member, and said disc member being received in said casing and serving as a bearing member for said plate, thereby forming a pivotal mount for said separating plate in said casing, said base disc member carrying ports adapted to establish communication at predetermined moments during the oscillation of said impeller between said compartments and said inlet and outlet ports.

2. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, and means actuated by said impeller for establishing communication between the interior chamber and said ports, said impeller being provided with a transverse slot and said means including in part a separating plate extending transversely across said interior chamber and said slot, said plate being provided with a base disc member, and said disc member being received in said casing and serving as a bearing member for said plate, thereby forming a pivotal mount for said separating plate in said casing, said base disc member carrying ports adapted to establish communication at predetermined moments during the oscillation of said impeller between said compartments and said inlet and outlet ports.

3. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, a plate having ports adapted upon actuation by said impeller to establish a communication between the interior chamber and said inlet and outlet ports, said impeller being provided with a transverse slot, and another plate connected to said first-mentioned plate, extending transversely through said slot between the side walls of said chamber.

4. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber and means to prevent rotation of the impeller while permitting it to oscillate to rotate said compartments, whereby it will draw in gas or vapor through the inlet port and carry it through the casing to adjacent the outlet port and compress it, said means having a fin portion engaging said impeller and a disc-shaped portion provided with ports adapted to establish a communication between the interior chamber and said inlet and outlet ports at predetermined positions of said impeller.

5. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, and means to prevent rotation of the impeller while permitting it to oscillate to rotate said compartments, whereby it will draw in gas or vapor through the inlet port and carry it through the casing to adjacent the outlet port and compress it, said means being oscillated by said piston and having a wall-shaped projection engaging said impeller to prevent rotation thereof and also having a disc having ports located at predetermined distances from said wall-shaped projection, said disc ports etsablishing communication between said inlet and outlet ports and said interior chamber, the peripheral wall of said interior chamber being provided with a recess and said disc being received and turning in said recess.

6. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, said means having a port continuously connecting the interior chamber with said intake port and at least two other ports intermittently connecting the interior of said chamber with said outlet port, said means formed of two plates transversely connected to each other, said casing being provided with a recess to receive one of said plates and said impeller being provided with a recess to receive the other of said plates.

7. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, and means to prevent rotation of the impeller while permitting it to oscillate to rotate said compartments, whereby it will draw in gas or vapor through the inlet port and carry it through the casing to adjacent the outlet port and compress it, said means including a disc provided with a slot continuously connecting the interior chamber with said intake port and two openings intermittently connecting the interior chamber with said outlet port, said disc being received in a recess in the peripheral wall of said interior chamber.

8. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, a cover carried by said casing, inlet pipes and outlet pipes carried by said cover, and passageways in said cover communicating with said pipes, said means being provided with a disc received in a recess in said wall of said interior chamber and having ports adapted to establish communication between the interior chamber and said passageways.

9. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, a cover carried by said casing, two pipes carried by said cover, one of said pipes comprising two interconnected branches communicating with separate channels formed in said cover, and the other of said pipes communicating with another channel formed in said cover, said means being oscillated by said impeller and having a wall-shaped projection engaging said impeller, and also having a disc with a slot continuously connecting the interior chamber with the second-mentioned channel and with two ports intermittently connecting the interior chamber with the first-mentioned channels.

10. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments, whereby it will draw in gas or vapor through the inlet port and carry it through the casing to adjacent the outlet port and compress it, and a reversing valve associated with said outlet port, said means being provided with a plate member received in the recess in said casing and with a second plate member transverse to said first plate member received in a slot in said impeller, said first plate member forming a pivotal mount for said second plate member and said first plate member being provided with ports to control the compression of the fluids in said interior chamber.

11. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments whereby it will draw in gas or vapor through the inlet port and carry it through the casing to adjacent the outlet port and compress it, a valve casing connected with the first-mentioned casing, a reversing valve mounted within said valve casing, and inlet and outlet pipes carried by said valve casing, said means having a plurality of ports leading to the interior chamber, and said valve regulating the communication between said ports and said pipes, said means being also provided with a transverse wall received in a slot in said impeller, said wall extending between the side walls of said interior chamber.

12. In a gas and fluid compressor, a casing with an interior spherical chamber with spaced side walls and a connecting continuous spherical peripheral wall and with inlet and outlet ports, an impeller, the side surfaces of which alternately approach and depart from the side walls of the chamber during the oscillating movement of the impeller, said impeller being provided with a peripheral spherical surface located in close adjuxtaposition with respect to the continuous spherical peripheral wall of the chamber and said impeller dividing said chamber into a plurality of reversely congruent wedge-like compartments, a rotatable driving shaft provided with an oblique cam element actuating said impeller and holding it obliquely in said chamber, means to prevent rotation of the impeller while permitting it to oscillate to rotate said compartments whereby it will draw in gas or vapor through the inlet port and carry it through the casing to adjacent the outlet port and compress it, a cover carried by said casing including a cylindrical valve casing, a reversing valve rotatably mounted within said valve casing, and inlet and outlet pipes carried by said valve casing, said means provided with a disc received in a recess in the walls of said chamber, said disc having a plurality of ports leading to the interior chamber, and said cover having a plurality of channels connecting the valve casing with said ports, and said valve regulating the communication between said channels and said pipes.

13. In a spherical engine, a casing provided with an interior spherical chamber with spaced side walls and with a spherical peripheral wall, a cavity being provided in one side of said spherical peripheral wall, a valve insert positioned in said cavity and having a spherical depression therein coincident with said spherical wall and being provided with a plurality of inlet and outlet port openings in said depression, said valve insert also being provided with a separating wall between said inlet and outlet ports extending into said chamber, and a disc-like impeller with side walls tending to diverge from the side walls of said chamber and with a peripheral spherical edge located in close adjuxtaposition to said inlet and outlet port openings said impeller being provided with a slot receiving said separating wall, and means to oscillate said peripheral edge across said openings to control the flow of fluid into or out of the chamber.

14. In a spherical engine, a casing with an interior fluid receiving chamber with spaced side walls and with a spherical peripheral wall, a disc-like impeller positioned obliquely within said chamber dividing said chamber into a plurality of reversely congruent wedge-like compartments, the edge of said impeller being of spherical shape and being located in close adjuxtaposition to the spherical peripheral wall of the chamber, and means to cause said impeller to move over the side walls and to oscillate laterally across the peripheral wall of said chamber, said means including a plate fitting into a transverse slot in the impeller, said plate being provided with a base disc fitted into a recess in the peripheral wall of the chamber and carrying inlet and outlet port means.

15. In a mechanism of the type having a spherical chamber with spaced side walls and a spherical peripheral wall, an obliquely located disc-like impeller therein, and means to cause said impeller to have an oscillating movement in respect to said side walls within said chamber; the combination therewith of an oscillating valve plate including an imperforate fin having a spherical edge and a base plate therefor with inlet and outlet port means separated by said fin, said base plate being adapted to be received and to oscillate within a circular recess in the peripheral wall of the chamber, said impeller being provided with a slot to receive said imperforate fin.

16. In a spherical machine of the type having a spherical chamber with spaced side walls and a spherical peripheral wall, an obliquely located disc-like impeller therein, and means to cause said impeller to have an oscillating movement in respect to said side walls within said chamber; the combination therewith of a fin extending into said chamber and a base plate forming a part of the peripheral wall of the chamber, said base plate being provided with a spherical depression serving as a continuation of said spherical peripheral wall and being adapted to receive the peripheral edge of said impeller and carrying inlet and outlet port means on opposite sides of said fin, said impeller being provided with a slot to receive said imperforate fin.

17. In a mechanism of the type having a spherical chamber with spaced side walls and a spherical peripheral wall, an obliquely located disc-like impeller therein, and means to cause said impeller to have an oscillating movement in respect to said side walls within said chamber; the combination therewith of a porting device having an imperforate fin extending into said chamber with a base disc plate having a spherical depression and provided with port means on opposite sides of said fin, said impeller being provided with a slot to receive said fin and the peripheral wall of said chamber being provided with a recess to receive said base plate.

18. In a mechanism of the type having a spherical chamber with spaced side walls and a spherical peripheral wall, an obliquely located disc-like impeller therein, and means to cause said impeller to have an oscillating movement in respect to said side walls within said chamber; the combination therewith of a valving device having a central separating wall and a base plate, said base plate carrying an inlet slot and outlet ports on opposite sides of said separating wall, said impeller being provided with a slot to receive said separating wall and the peripheral wall of said chamber being provided with a recess to receive said base plate.

19. In a fluid actuator, a spherical enclosure, an impelling piston member extending across said enclosure, a fluid reaction member also extending across said enclosure, holding means to hold said impelling piston member and said fluid reaction member obliquely in respect to each other, whereby their opposing faces will diametrically oppositely approach and diverge from each other to form an annular-like wedge-shaped fluid receiving and discharging compartment, said oblique holding means being adapted to undergo rotational movement, shaft means to undergo rotational movement with said oblique holding means, inlet and outlet connections to and from said enclosure, guide means cooperating with said holding means to cause said impelling piston member and said fluid reaction member to undergo a relative oscillating movement simultaneously with rotation of said oblique holding means and said shaft, whereby said wedge-shaped fluid receiving and discharging compartment is rotated into and out of communication with said inlet and outlet connections, said outlet and inlet connections being separated from each other and said compartment being divided into two sub-compartments, one of which increases in volume in communication with the inlet connection and the other of which decreases in volume with the outlet connection during the rotation of the compartment, said guide means being provided with port openings to control the flow between said inlet and outlet connections and said enclosure so that said communication is only established to said outlet connection after said other sub-compartment has decreased in volume by a predetermined amount.

20. In a fluid actuator, a spherical enclosure, an impelling piston member extending across said enclosure, a fluid reaction member also extending across said enclosure, means to hold said impelling piston member and said fluid reaction member obliquely in respect to each other whereby their opposing faces will diametrically oppositely approach and diverge from each other to form an annular-like wedge-shaped fluid receiving and discharging compartment, said oblique holding means being adapted to undergo rotational movement, shaft means to undergo rotational movement with said oblique holding means, inlet and outlet connections to and from said enclosure, guide means to cause said impelling piston member and said fluid reaction member to undergo a relative oscillating movement simultaneously with rotation of said oblique holding means and said shaft, whereby said wedge-shaped fluid receiving and discharging compartment is rotated into and out of communication with said inlet and outlet connections, said outlet and inlet connections being separated from each other, said compartment being divided into two sub-compartments one of which increases in volume in communication with the inlet connection and the other of which decreases in volume with the outlet connection during the rotation of the compartment, said enclosure and said piston member being provided with recesses to receive said guide means, said guide means being formed of a pivotal valve plate fitting in said recess in said enclosure and of a fin member fitting in said recess in said piston member.

21. In a fluid actuator, a spherical enclosure, an impelling piston member extending across said enclosure, a fluid reaction member also extending across said enclosure, holding means to hold said impelling piston member and said fluid reaction member obliquely in respect to each other, whereby their opposing faces will diametrically oppositely approach and diverge from each other to form an annular-like wedge-shaped fluid receiving and discharging compartment, said oblique holding means being adapted to undergo rotational movement, shaft means to undergo rotational movement with said oblique holding means, inlet and outlet connections to within said enclosure, guide means cooperating with said holding means to cause said impelling piston member and said fluid reaction member to undergo a relative oscillating movement simultaneously with rotation of said oblique holding means and said shaft, whereby said wedge-shaped fluid receiving and discharging compartment is rotated into and out of communication with said inlet and outlet connections, said outlet and inlet connections being separated from each other and said compartment being divided into two subcompartments, one of which increases in volume in communication with the inlet connection and the other of which decreases in volume with the outlet connection during the rotation of the compartment, said guide means being provided with port openings to control the flow between said inlet and outlet connections and said enclosure so that said communication is only established between at least one of said connections and said enclosure during only part of the time the respective sub-compartments are changing in volume.

ALOIS WICHA.